(12) United States Patent
Selinger et al.

(10) Patent No.: US 7,536,322 B1
(45) Date of Patent: May 19, 2009

(54) IDENTIFYING EARLY ADOPTERS AND ITEMS ADOPTED BY THEM

(75) Inventors: David L. Selinger, Seattle, WA (US);
Bhavnish Lathia, Seattle, WA (US);
Hoi-Cheung Pang, Seattle, WA (US);
David Liu, Seattle, WA (US);
ShengHuo Zhu, Seattle, WA (US); Paat Rusmevichientong, Ithaca, NY (US)

(73) Assignee: Amazon Technologies, Inc., Incline Village, NV (US)

( * ) Notice: Subject to any disclaimer, the term of this patent is extended or adjusted under 35 U.S.C. 154(b) by 373 days.

(21) Appl. No.: 10/804,811

(22) Filed: Mar. 19, 2004

(51) Int. Cl.
*G06F 17/30* (2006.01)

(52) U.S. Cl. .................. 705/27; 705/1; 705/26

(58) Field of Classification Search ............ 705/26, 705/27
See application file for complete search history.

(56) References Cited

U.S. PATENT DOCUMENTS

| | | | | |
|---|---|---|---|---|
| 6,049,778 | A * | 4/2000 | Walker et al. | 705/14 |
| 6,405,175 | B1 * | 6/2002 | Ng | 705/14 |
| 6,708,156 | B1 * | 3/2004 | Gonten | 705/10 |
| 6,735,572 | B2 * | 5/2004 | Landesmann | 705/14 |
| 7,136,830 | B1 * | 11/2006 | Kuelbs et al. | 705/27 |
| 7,146,416 | B1 * | 12/2006 | Yoo et al. | 709/224 |
| 7,376,588 | B1 | 5/2008 | Gregov et al. | |
| 2003/0004835 | A1 * | 1/2003 | Grey et al. | 705/27 |
| 2003/0149610 | A1 * | 8/2003 | Rowan et al. | 705/10 |
| 2004/0249700 | A1 | 12/2004 | Gross | |
| 2004/0249713 | A1 * | 12/2004 | Gross | 705/14 |
| 2004/0260574 | A1 | 12/2004 | Gross | |
| 2004/0260600 | A1 * | 12/2004 | Gross | 705/10 |
| 2004/0260688 | A1 | 12/2004 | Gross | |
| 2004/0267604 | A1 * | 12/2004 | Gross | 705/10 |
| 2005/0283394 | A1 * | 12/2005 | McGloin et al. | 705/10 |
| 2005/0283406 | A1 * | 12/2005 | Kuelbs et al. | 705/26 |
| 2006/0106665 | A1 * | 5/2006 | Kumar et al. | 705/10 |

OTHER PUBLICATIONS

Solomon, Mary Beth, "Targeting Trendsetters" Marketing Research Forum, Summer 1996, vol. 8, No. 2.*

* cited by examiner

*Primary Examiner*—Jeffrey A. Smith
*Assistant Examiner*—Jason Dunham
(74) *Attorney, Agent, or Firm*—Knobbe, Martens, Olson & Bear LLP

(57) ABSTRACT

Computer processes are disclosed for identifying and informing users of early adopter items. In one embodiment, scores are generated for particular items represented in an electronic catalog, with each score reflecting an extent to which a corresponding item has been ordered by customers who tend to order items promptly after they become available. Information pertaining to such scores may be incorporated into item detail pages of the electronic catalog to assist customers in making item selection decisions. For example, the electronic catalog may identify specific items as early adopter items, and/or may display information pertaining to the degree to which specific items are early adopter items.

19 Claims, 19 Drawing Sheets exhaustive product purchase table ⟶ 300

| Product ID | Purchase Date | Launch Date | Customer ID | Units Purchased | Purchase Price |
|---|---|---|---|---|---|
| ... | | | | | |
| 12117893 | 10/04/03 | 10/02/03 | 17193262 | 1 | $ 129.97 |
| 27356254 | 10/06/03 | 08/10/03 | 17193262 | 3 | $ 27.95 |
| 46419623 | 09/15/03 | 09/13/03 | 17193262 | 1 | $ 1,265.50 |
| 12117893 | 11/26/03 | 10/02/03 | 43692031 | 1 | $ 125.00 |
| 12117893 | 12/14/03 | 10/02/03 | 09342661 | 2 | $ 125.00 |
| 12117893 | 10/20/03 | 10/02/03 | 33560211 | 8 | $ 127.00 |
| ... | | | | | |

*FIG. 3*

| Customer ID | Customer Score | Total Spent | Total Units Purchased | Last Purchase Date | Average Spent Per Unit | High Value |
|---|---|---|---|---|---|---|
| ... | | | | | | |
| 17193262 | 0 | 0 | 0 | 1/1/00 | 0 | no |
| ... | | | | | | |

*FIG. 5A*

| Customer ID | Customer Score | Total Spent | Total Units Purchased | Last Purchase Date | Average Spent Per Unit | High Value |
|---|---|---|---|---|---|---|
| ... | | | | | | |
| 17193262 | 15.164 | $1,479.32 | 5 | 10/06/03 | 0 | no |
| ... | | | | | | |
| 511 | 512 | 513 | 514 | 515 | 521 | 522 | aggregated customer information table — 500
501

*FIG. 5B*

| Customer ID | Customer Score | Total Spent | Total Units Purchased | Last Purchase Date | Average Spent Per Unit | High Value |
|---|---|---|---|---|---|---|
| ... | | | | | | |
| 17193262 | 3.894 | $1,479.32 | 5 | 10/06/03 | $295.86 | yes |
| ... | | | | | | | aggregated customer information table

FIG. 5C product purchases by early adopters table — 900

| Product ID | Purchase Date | Launch Date | Customer Score | Units Purchased | Purchase Price | High Value |
|---|---|---|---|---|---|---|
| ... | | | | | | |
| 12117893 | 10/05/03 | 10/02/03 | 3.894 | 1 | $ 129.97 | yes |
| 27356354 | 10/06/03 | 08/10/03 | 3.894 | 3 | $ 27.95 | yes |
| 46419623 | 09/15/03 | 09/13/03 | 3.894 | 1 | $ 1,265.50 | yes |
| 12117893 | 12/14/03 | 10/02/03 | 2.140 | 2 | $ 125.00 | no |
| 12117893 | 10/20/03 | 10/02/03 | 3.701 | 8 | $ 127.00 | yes |
| ... | | | | | | |
| 911 | 912 | 913 | 914 | 915 | 916 | 917 |

*FIG. 7* aggregated product information table — 1100

| Product ID | Product Score | Total Units Purchased | Total Units Purchased By High Value Customers |
|---|---|---|---|
| ... | | | |
| 12117893 | 0 | 0 | 0 |
| ... | | | |
| 1111 | 1112 | 1113 | 1114 |

*FIG. 9A*

| aggregated product information table 1100 | | | Total Units Purchased By High Value Customers 1101 |
|---|---|---|---|
| Product ID | Product Score | Total Units Purchased | |
| ... | | | |
| 12117893 | 9.735 | 11 | 9 |
| ... | | | |
| 1111 | 1112 | 1113 | 1114 |

*FIG. 9B*

| Product ID | Product Score |
|---|---|
| ... | |
| 12117893 | .855 |
| ... | | product score table — 1400, 1401, 1112, 1411

FIG. 11

| Customer ID | Customer Score | High Value |
|---|---|---|
| ... | | |
| 17193262 | 3.894 | yes |
| ... | | | customer score table — 1500, 1501, 1511, 1512, 1513

FIG. 12

IDENTIFYING EARLY ADOPTERS AND ITEMS ADOPTED BY THEM

TECHNICAL FIELD

The present invention is directed to the fields of electronic commerce and differentiation of purchasers and items.

BACKGROUND

Web merchants sell a variety of items using web sites accessed by customers over the Internet or similar networks. These items can include virtually anything that can be purchased, such as physical products like cameras, data products like e-books, services, and subscriptions, among others.

Web merchants provide customers with a rich shopping experience at any time, from virtually anywhere in the world. Customers accessing a web merchant's web site can obtain a variety of information about items, and place orders for them. Shoppers increasingly favor this form of shopping for its high levels of convenience and purchase-satisfaction.

Web merchants benefit when they are able to generate interest in their web sites that leads to customers shopping at their web sites and ultimately placing orders for items there. One way of generating interest in a website is for the website to become known as the place to shop in order to find and purchase the newest and most popular products. Identifying these products to market to consumers, however, has often been a hit-or-miss proposition for retailers. Some new products have launched to great fanfare and promise, only to fail in the marketplace, and other products have launched to little publicity but have captured the public's interest and seen sales soar. Retailers have typically been forced to rely on the in-house expertise of buyers in order to identify the next "big" products, and errors in such identification often leads to excess unsold inventory or items sold at a significant discount. Moreover, improved forecasting techniques that could tell a manufacturer of the expected demand for an item would greatly assist the manufacturer to more accurately predict how much of the item needs to be manufactured. As a result, it would be beneficial to have an improved system and technique to assist a web merchant in identifying more relevant items to customers and to guide manufacturers as to expected demand.

BRIEF DESCRIPTION OF THE DRAWINGS

FIG. 3 is a data structure diagram showing sample contents of an exhaustive product purchase table typically used by the facility.

FIG. 5A is a table diagram showing sample contents of an aggregated customer information table typically used by the facility.

FIG. 5B is a table diagram showing sample contents of the aggregated customer information table after the facility has processed all of the rows of the exhaustive product purchase table for customer 17193262.

FIG. 5C is a table diagram showing sample contents of the aggregated customer information table after the facility has processed each row of the aggregated customer information table.

FIG. 7 is a table diagram showing sample contents of the product purchases by early adopters table.

FIG. 9A is a table diagram showing sample contents of the aggregated product information table after a row is created and initialized.

FIG. 9B is a table diagram showing sample contents of the aggregated product information table after performance of the steps shown in FIG. 8.

FIG. 11 is a table diagram showing sample contents of a product score table typically used by the facility.

FIG. 12 shows sample contents of a customer score table typically used by the facility.

DETAILED DESCRIPTION

A software facility for identifying (1) members of an "early adopters" class of customers and/or (2) "early adopter picks"—products or other items disproportionately purchased by early adopters ("the facility") is described. Early adopters are customers who seek out new products within one or more product categories, and whose purchase of particular products not yet popular with or well-known to mainstream consumers tends to predict and/or cause later widespread purchasing of these products, i.e., the emergence of these products as "the next big thing."

The facility identifies early adopters by analyzing and scoring the purchasing behavior of all customers. The facility then identifies early adopter picks by analyzing and scoring products based upon their history of being purchased by customers identified as early adopters. In some embodiments, the facility excludes mass-market products from inclusion as early adopter picks to maintain a sense of exclusivity around the early adopters and their selections. In some embodiments, the facility is able to identify early adopters and early adopter picks without using any preexisting information about the size of the market for each product.

By identifying these early adopters and early adopter picks and featuring them on their web sites, a web merchant may derive significant benefits, including: increasing credibility with customers in general, in turn increasing customer traffic; increasing credibility with product manufacturers and suppliers, in turn inducing them to more readily offer important products for sale by the web merchant on favorable terms; obtaining a disproportionate number of orders for early adopter picks, which often sell at high margins; and implementing a stocking strategy for early adopter picks that places the web merchant in position to respond to anticipated future demand.

Web merchants may profile or otherwise promote the identified early adopters, either as a group or individually. Web merchants may also promote the identified early adopter picks, using such approaches as including an early adopter pick designation on their item detail pages on the web merchant's web site, displaying lists of them in various locations on the web merchant's web site, and publishing a recurring opt-in email dispatch listing them.

Figure 1:
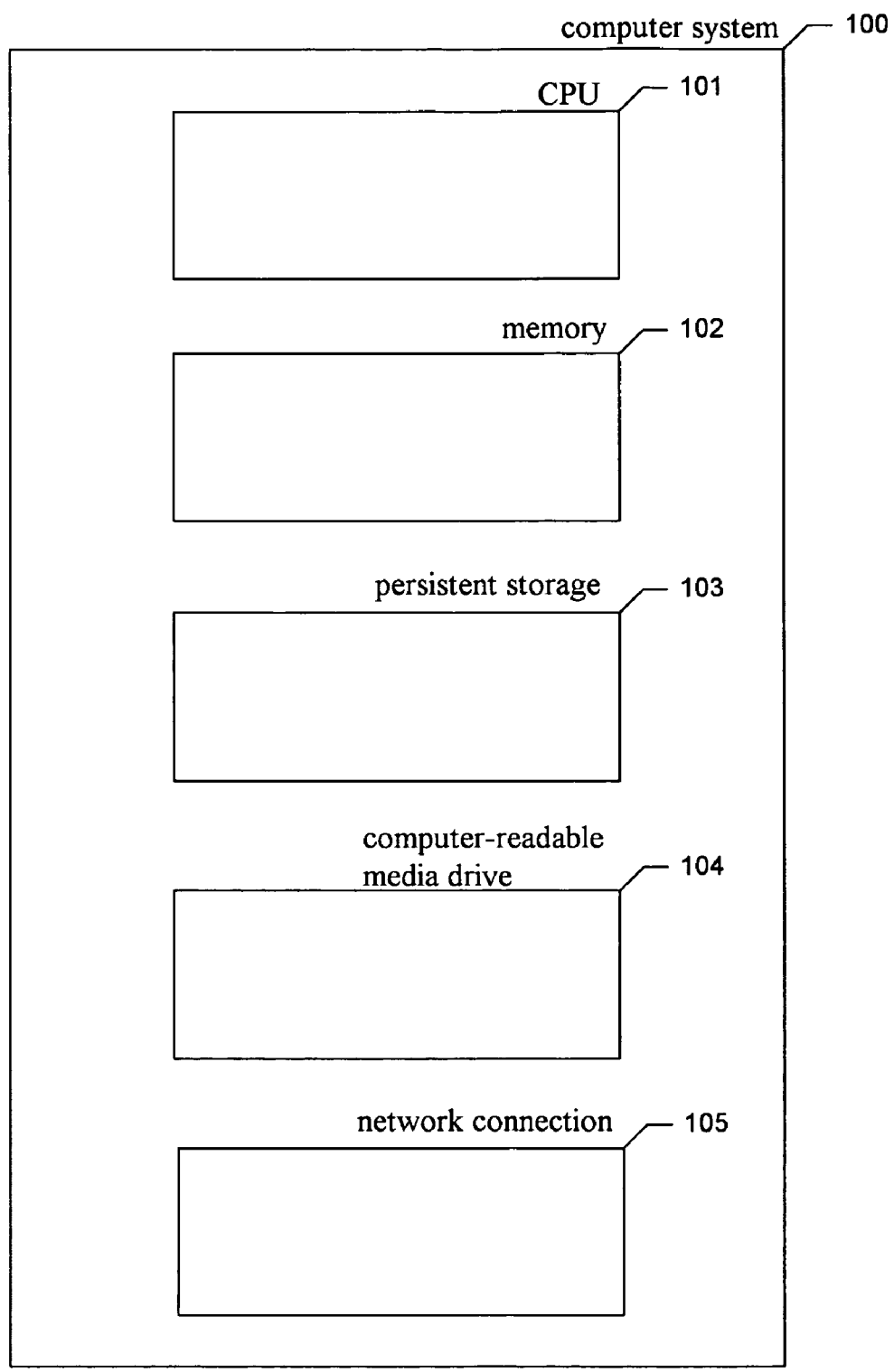
FIG. 1 is a block diagram showing some of the components typically incorporated in at least some of the computer systems and other devices on which the facility executes.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 2:
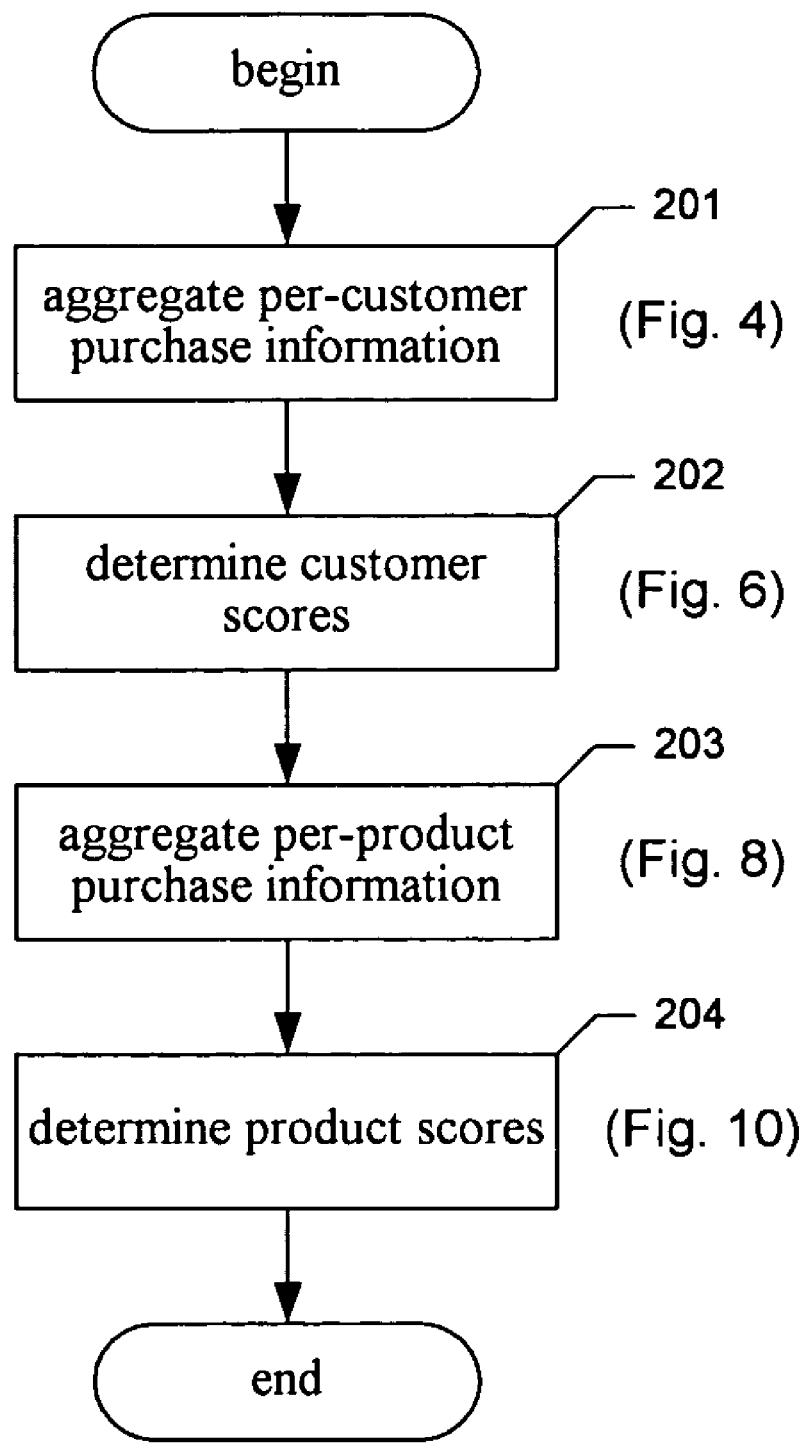
FIG. 2 is a flow diagram showing an overview of the steps typically performed by the facility in order to identify early adopters and early adopter picks.

FIG. 2 is a flow diagram showing an overview of the steps typically performed by the facility in order to identify early adopters and early adopter picks. In step 201, the facility aggregates information about purchases made by each customer from among information about purchases made by all customers. Step 201 is described in more detail below in conjunction with FIG. 4. In step 202, the facility uses the per-customer purchase information to determine customer scores for each customer. These customer scores reflect the extent to which each customer is considered to be an early adopter. Step 202 is discussed in greater detail below in conjunction with FIG. 6. In step 203, the facility aggregates purchase information about each product from among purchase information for all products. Step 203 is discussed in greater detail below in conjunction with FIG. 8. In step 204, the facility uses the aggregated per-purchase information to determine product scores for each product. These product scores reflect the extent to which each product is considered to be an early adopter pick. Step 204 is discussed in greater detail below in conjunction with FIG. 10. After step 204, these steps conclude. The steps of FIG. 2 may be performed periodically to determine updated scores for customers and products. These scores may be used in a variety of ways to promote high scoring products and/or customers. Those skilled in the art will recognize that the steps shown in FIG. 2, as well as the steps shown in the additional flow diagrams discussed hereafter, could be performed in a variety of ways, including performing these steps in a different order, or, in some cases, in parallel; performing a proper subset of these steps, performing a proper superset of these steps; etc.

FIGS. 3-15 show additional detail about the process performed by the facility in various embodiments, illustrated with sample data.

FIG. 3 is a data structure diagram showing sample contents of an exhaustive product purchase table typically used by the facility. The exhaustive product purchase table 300 contains a row for each purchase of one or more units of a product by a customer, such as rows 301-306. Each row is divided into the following columns: a product ID column 311 containing a numerical identifier that uniquely identifies the product that was purchased; a purchase date column that contains the date on which the product was purchased; a launch date column 313 that contains the date on which the purchased product was launched, such as the date on which it first became available for ordering from the web merchant; a customer ID column 314 containing a numerical identifier uniquely identifying the customer who purchased the product; a units purchase column 315 containing the number of units of the product that were purchased by the customer; and a purchase price column 316 containing the price paid by the customer to purchase the product. For example, row 305 indicates that, on Dec. 14, 2003, customer 09342661 purchased two units of product 12117893—which was launched on Oct. 2, 2003—for $125.00 each. Those skilled in the art will recognize that the data shown in FIG. 3 and the data shown in the additional table diagrams discussed hereafter, or similar data, could be stored in a variety of different forms, including being stored in various types of memory devices, in various organizations, in one or more tables, using various forms of indexing, compression, encryption, etc.

Figure 4:
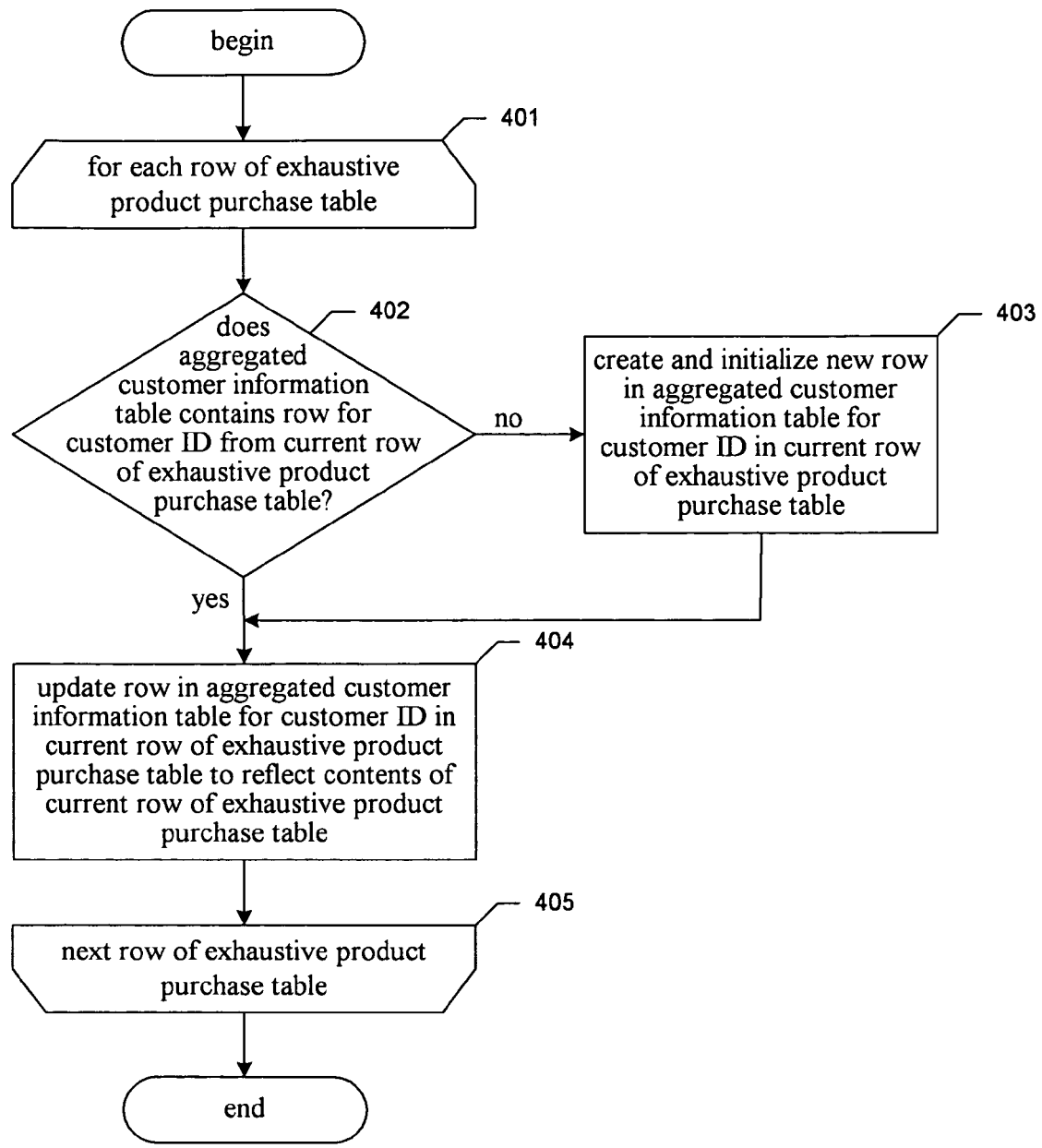
FIG. 4 is a flow diagram showing steps typically performed by the facility to aggregate per-customer purchase information.

FIG. 4 is a flow diagram showing steps typically performed by the facility to aggregate per-customer purchase information. In steps 401-405, the facility loops through each row of the exhaustive product purchase table 300. In step 402, the customer ID from the current row of the exhaustive product purchase table is identified, and a search made to determine whether an aggregated customer information table maintained by the facility contains a row for that customer ID. If the customer ID is already included in the aggregated customer information table, then the facility continues in step 404, else the facility continues in step 403. In step 403, the facility creates and initializes a new row in the aggregated customer information table for the customer ID that is in the current row of the exhaustive product purchase table.

FIG. 5A is a table diagram showing sample contents of an aggregated customer information table 500 typically used by the facility. In particular, FIG. 5A shows this table immediately after the facility has created and initialized a new row in the table in step 403 for customer 17193262. The aggregated customer information table 500 eventually contains a row for each customer for which the exhaustive product purchase table contains at least one purchase. Each row is divided into a number of columns: a customer ID column 511 containing the customer's customer identifier; a customer score column 512 containing a customer score determined by the facility; a total spent column 513 indicating the total dollar amount of the customer's purchases; a total units purchase column 514 containing the total number of product units purchased by the customer; a last purchase date column 515 containing the date of the most recent purchase made by the customer; an average spent per unit column 521 containing the total spent divided by total units purchased; and a high value column 522 containing a flag indicating whether the customer is believed to constitute a high value customer—that is, a customer that frequently purchases high-price items. Row 501 shows the contents of these columns immediately after the row was initialized for customer 17193262.

Referring to FIG. 4, in step 404 the facility updates the row in the aggregated customer information table for the customer ID in the current row of the exhaustive product purchase table to reflect the contents of the current row of the exhaustive product purchase table. In some embodiments, this involves (a) adding the following value to the value in the customer score column:

7−ln(purchase date−launch date);

(b) adding the following value to the value in the total spent column:

units purchased*purchase price;

(c) adding the units purchased to the value in the total purchases column; and (d) if the purchase date from the current row of the exhaustive product purchase table is later than the date that is presently in the last purchase date column, replacing the date that is presently in the last purchase date column with the purchase date from the current row of the exhaustive product purchase table. In other embodiments, the facility uses various other approaches to performing step 404, and, in particular, may use a different mathematical expression to assign a value to the customer score column.

In step 405, if additional rows remain in the exhaustive product purchase table to process, the facility continues in step 401 to process the next row of the table, otherwise these steps conclude.

FIG. 5B is a table diagram showing sample contents of the aggregated customer information table 500 after the facility has processed all of the rows of the exhaustive product purchase table for customer 17193262. The values in column 512-515 of row 501 show the information aggregated for this customer. In particular, the customer score column 512 contains the customer score 15.164 calculated using the values in the purchase date and the launch date columns of rows 301-303 of the exhaustive product purchase table 300; the total spent column 513 contains the value $1,479.32, obtained by, for each of rows 301-303, multiplying purchase price by units purchased and adding together the products; the total units purchased column 514 contains the value 5, obtained by summing the units purchased column for rows 301-303; and the last purchase date column 515 contains the date Oct. 6, 2003, the latest of the dates in the purchase date column of rows 301-303. Row 501 is further modified later as discussed below in conjunction with FIG. 6 and shown in FIG. 5C.

Figure 6:
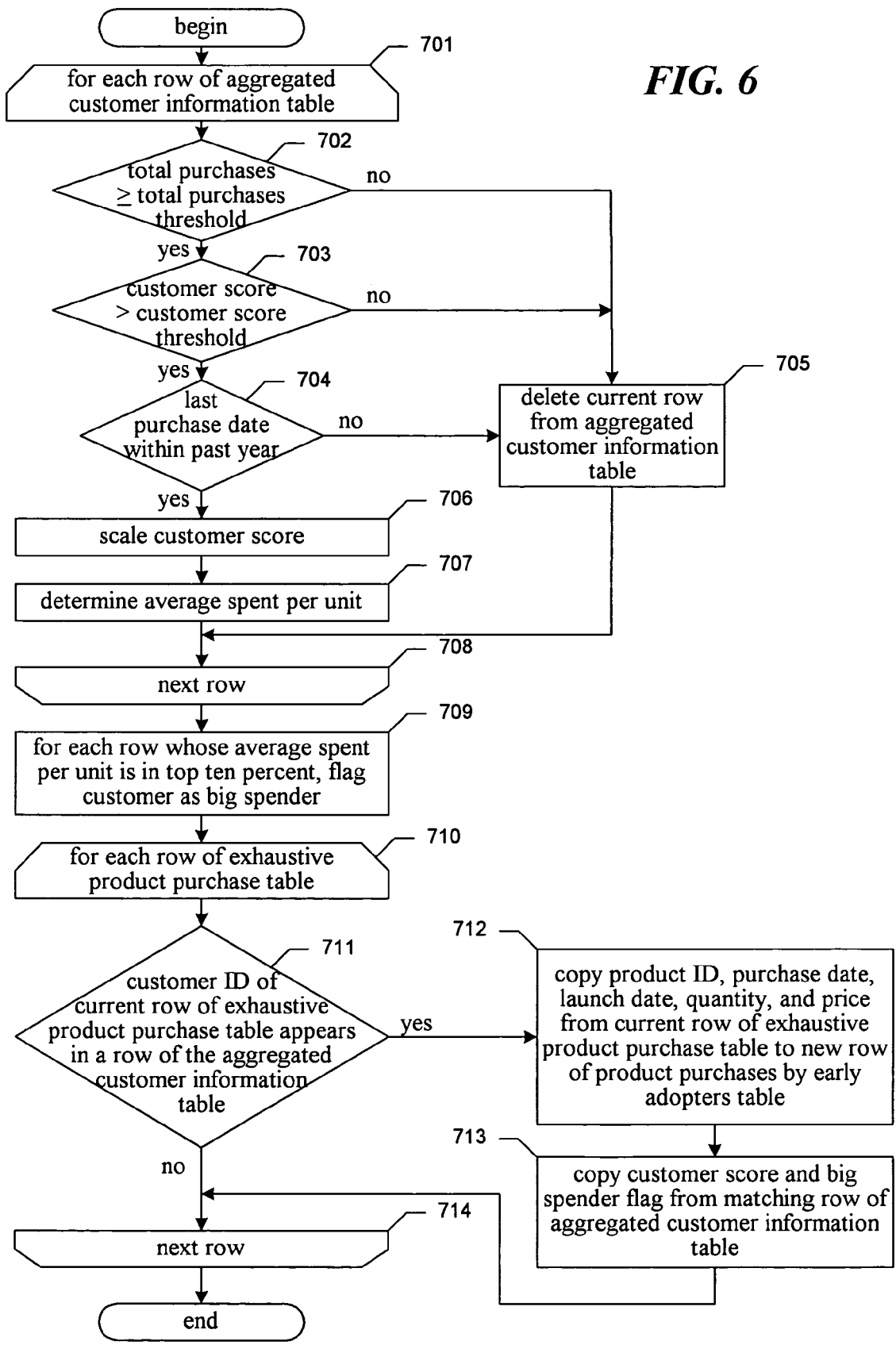
FIG. 6 is a flow diagram showing steps typically performed by the facility to determine customer scores.

FIG. 6 is a flow diagram showing steps typically performed by the facility to determine customer scores. In step 701-708, the facility loops through each row of the aggregated customer information table 500. In step 702, if the value in the total purchases column of the current row is greater than or equal to a total purchases threshold (such as a threshold of 10), then the facility continues in step 703, else the facility continues in step 705. In step 703, if the value in the customer score column of the current row is greater than a customer score threshold such as zero, then the facility continues in step 704, else the facility continues in step 705. In step 704, if the date in the last purchase date column of the current row is within the past year, then the facility continues in step 706, else the facility continues in step 705. In step 705, the facility deletes the current row from the aggregated customer information table. After step 705, the facility continues in step 708. In step 706, the facility scales the customer score. In some embodiments, this involves taking the square root of the current value of the customer score. In step 707, the facility determines the average spent per unit by dividing the value in the total spent column 513 of the current row by the value in the total units purchased column 514 of the current row. The values determined by the facility in step 706 and 707 are each preferably written to the average spent per unit column 521 of the current row of the aggregated customer information table. In step 708, if additional rows of the aggregated customer information table remain to be processed, then the facility continues in step 701 to process the next such row, else the facility continues in step 709. In step 709, for each row whose average spent per unit falls in the highest percentile (such as in the top 10 percent) of all of the rows in the aggregated customer information table, the facility flags the customer as a high value customer by changing the value of the flag in the high value column 522 of the aggregated customer information table to yes.

FIG. 5C is a table diagram showing sample contents of the aggregated customer information table 500 after the performance of steps 701-709. It can be seen that, in accordance with step 706, the facility has scaled the value in the customer score column 512 by taking its square root. It can further be seen that the facility has determined the average spent per unit of $295.86 by dividing the total spent of $1,479.32 by the total units purchased, five. It can further be seen that the facility has set the high value flag in response to determining that the average spent per unit is in the top tenth percentile for all rows of the aggregated customer information table still remaining after step 705.

In steps 710-714, the facility loops through each row of the exhaustive product purchase table 300. In step 711, if the customer ID of the current row of the exhaustive product purchase table appears in a row of the aggregated customer information table (i.e., if such a row was created in step 403 and not subsequently deleted in step 705), then the facility continues in step 712, else the facility continues in step 714. In step 712, the facility creates a new row in a product purchases by early adopters table 900 (see FIG. 7) used by the facility that corresponds to the current row of the exhaustive product purchase table 300. In particular, the facility copies the following fields from the current row of the exhaustive product purchase table to the new row of the product purchases by early adopters table: Product ID, purchase date, launch date, quantity, and price. In step 713, the facility further populates the new row of the product purchased by early adopters table from the matching row of the aggregated customer information table. In particular, the facility copies the following fields from a matching row of the aggregated customer information table to the new row of the product purchased by early adopters table: Customer score and high value flag. In step 714, if additional rows of the exhaustive product purchase table remain to be processed, then the facility continues in step 710 to process the next such row, else these steps conclude.

FIG. 7 is a table diagram showing sample contents of the product purchases by early adopters table 900. The product purchases by early adopters table contains a row for each row of the exhaustive product purchase table made by customers whose customers' scores qualify them as early adopters, such as rows 901-905. Each row is divided into the following columns: a product ID column 911, a purchase date column 912, a launch date column 913, a customer score column 914, a units purchased column 915, a purchase price column 916, and a high value column 917. It can be seen the rows 901, 904, and 905 each correspond to purchases of one or more units of product 12117893 by early adopters. Note that these exclude a row corresponding to a purchase of the same product recorded in row 304 of the exhaustive product purchase table and corresponding to a customer not determined to be an early adopter.

Figure 8:
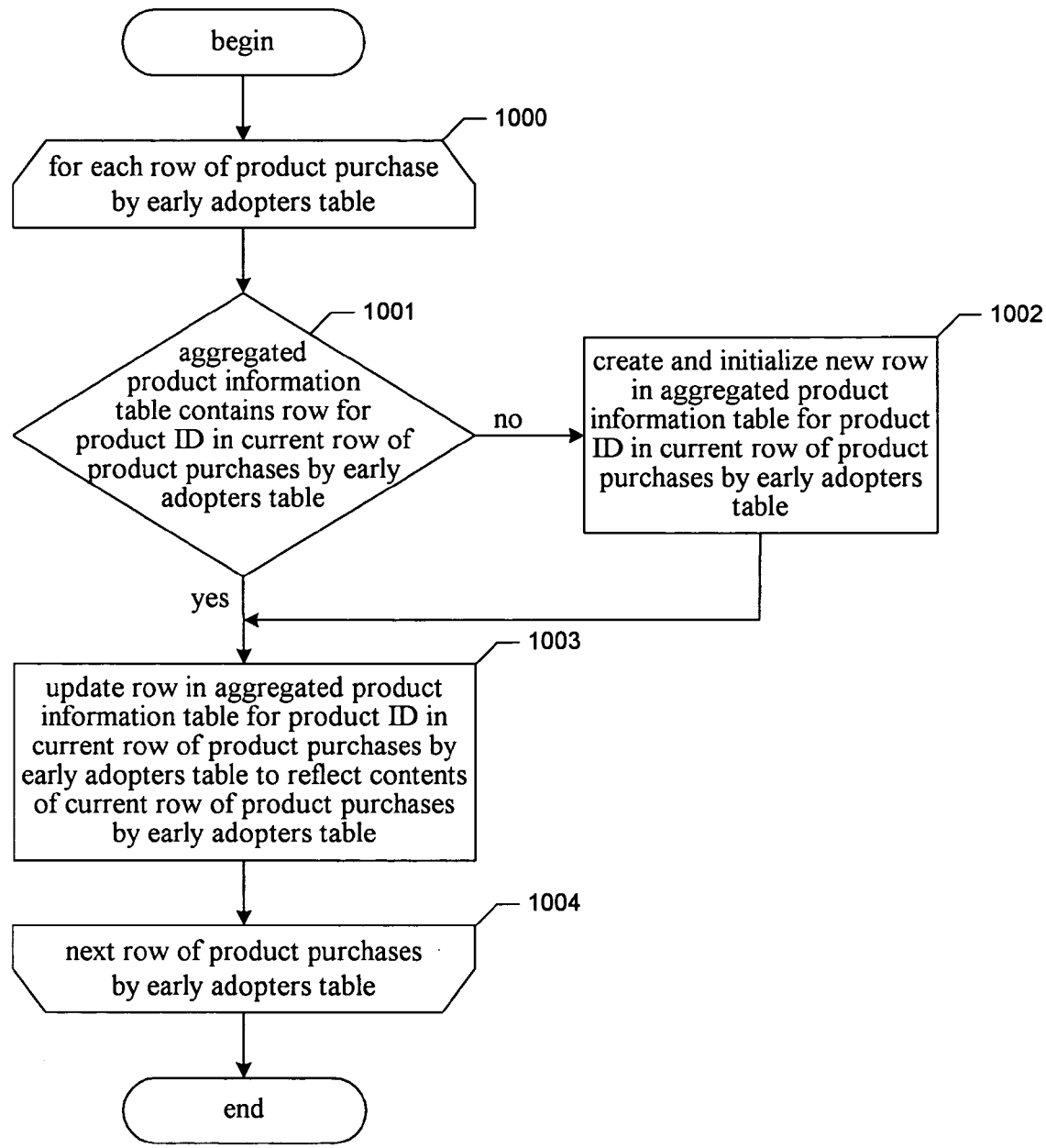
FIG. 8 is a flow diagram showing steps typically performed by the facility to aggregate per-product purchase information.

FIG. 8 is a flow diagram showing steps typically performed by the facility to aggregate per-product purchase information. In steps 1000-1004, the facility loops through each row of the product purchases by early adopters table 900. In step 1001, the product ID contained in the current row of the product purchases by early adopters table is identified, and a search made to determine whether an aggregated product information table 1100 (see FIG. 9) used by the facility contains a row corresponding to that product ID. If the aggregated product information table contains the product ID the facility continues in step 1003, else the facility continues in step 1002. In step 1002, the facility creates and initializes a new row in the aggregated product information table 300 for the product ID contained in the current row of the product purchases by early adopters table.

FIG. 9A is a table diagram showing sample contents of the aggregated product information table 1100 after a row is created and initialized in step 1002 for product 12117893. The row is divided into the following columns: a product ID column 1111, a product score column 1112, a total units purchased column 1113, and a total units purchased by high value customers column 1114.

In step 1003, the facility updates the row in the aggregated product information table 1100 for the product ID in the current row of the product purchases by early adopters table to reflect the contents of the current row of the product purchases by early adopters table. This involves: (a) adding to the value in the product score column 1112 the customer score from the current value of the product purchases by early adopters table; (b) adding to the value in the total units purchased column 1113 the units purchased from the current row of the product purchases by early adopters table; and (c) if the high value flag for the current row of the product purchases by early adopters table is set, adding to the value in the total units purchased by high value column 1114 the units purchased from the current row of the product purchases by early adopters table. In step 1004, if additional rows of the product purchases by early adopters table remain to be processed, the facility continues in step 1000 to process the next such row, else these steps conclude.

FIG. 9B is a table diagram showing sample contents of the aggregated product information table 1100 after performance of the steps shown in FIG. 8. It can be seen that, for row 1101 corresponding to product 12117893, the facility has determined a product score of 9.735 by summing the customer scores in rows 901, 904, and 905 of the product purchases by early adopters table 900; the facility has determined total units purchased to be 11 by summing the units purchased column of rows 901, 904, 905; and that the facility is determined the total units purchased by high value customers to be 9, the sum of the units purchased in rows 901 and 905.

Figure 10:
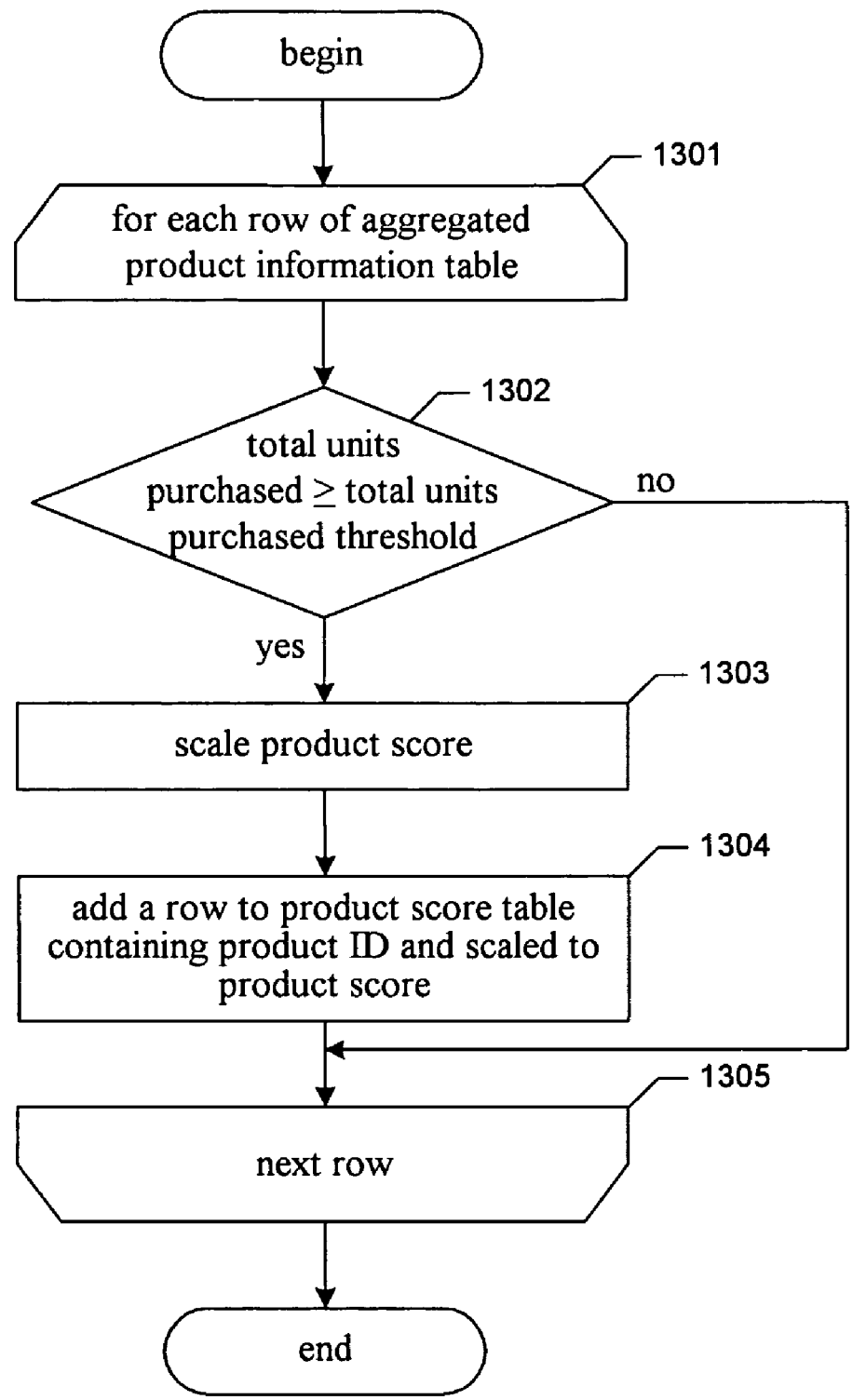
FIG. 10 is a flow diagram showing steps typically performed by the facility in order to determine product scores.

FIG. 10 is a flow diagram showing steps typically performed by the facility in order to determine product scores. In steps 1301-1306, the facility loops through each row of the aggregated product information table 1100. In step 1302, if the total units purchased in this row is greater than or equal to a total units purchased threshold (such as ten), then the facility continues in step 1303, else the facility continues in step 1305. In step 1303, the facility scales the product score, such as by multiplying it by one of the following quantities:

$$\ln(\text{highest price}) * e^{Decay * days\ since\ launch\ date}$$

$$(\text{highest price}) * e^{Decay\ days\ since\ launch\ date}$$

$$(\text{highest price})^2 * e^{Decay * days\ since\ launch\ date}$$

$$e^{Decay * days\ since\ launch\ date}$$

where Decay is a decay constant such as −0.1, and days since launch date is the number of days ago that the product was launched. In some embodiments, the facility scales the product score based upon a ratio of total units of the item purchased by high value customers to total units of the item purchased. Such scaling tends to favor the product scores of products a high percentage of whose units are purchased by high value customers. In some embodiments, the item's score is scaled higher for higher values of this ratio, and lower for lower values of this ratio, including scaling the item score to zero for values of this ratio below a threshold, such as 0.3. Those skilled in the art will appreciate that the item score could be scaled in a variety of other ways.

In step 1304, the facility adds a row to the product score table 1400 containing the product ID for the current row of the aggregated product information table in the scaled product score determined in step 1303. In step 1305, if additional rows of the aggregated product information table remain to be processed, the facility continues in step 1301 to have processed the next such row, else these steps conclude.

FIG. 11 is a table diagram showing sample contents of a product score table 1400 typically used by the facility. The product score table 1400 contains a row corresponding to each product appearing in the aggregated product information table for which the tests of step 1302 and 1303 are satisfied, including row 1401. Each row is divided into a product ID column 1411 and a product score column 1412 containing the scaled product score determined for the product in step 1304. This table may be used to identify products as early adopter picks, such as by filtering the table for product scores exceeding a certain threshold.

Figure 13A:
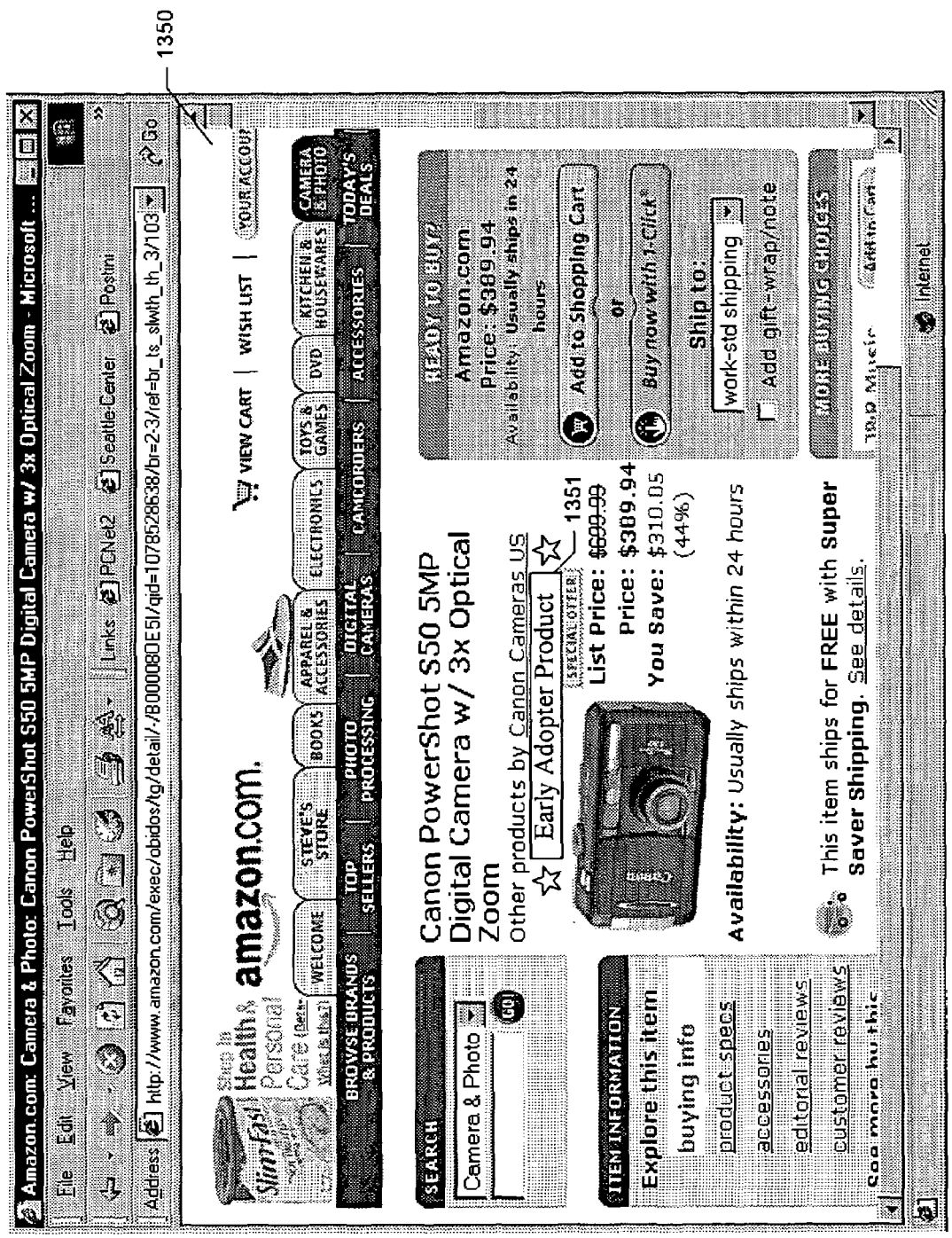
FIGS. 13A, 13B, 13C, and 14 are screenshots depicting the use of early adopters and early adopter picks to highlight items for sale.
Figure 13B:
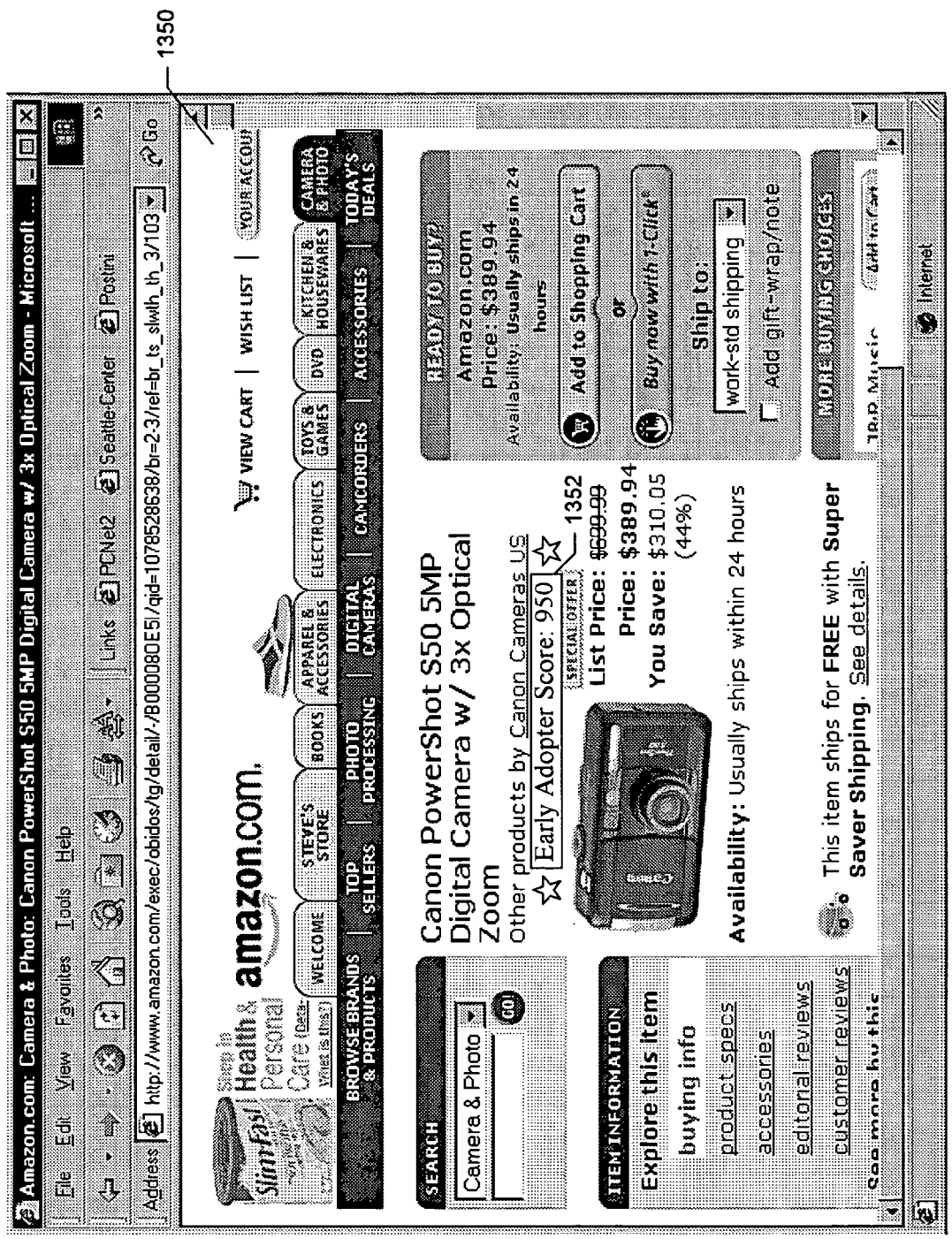
Figure 13C:
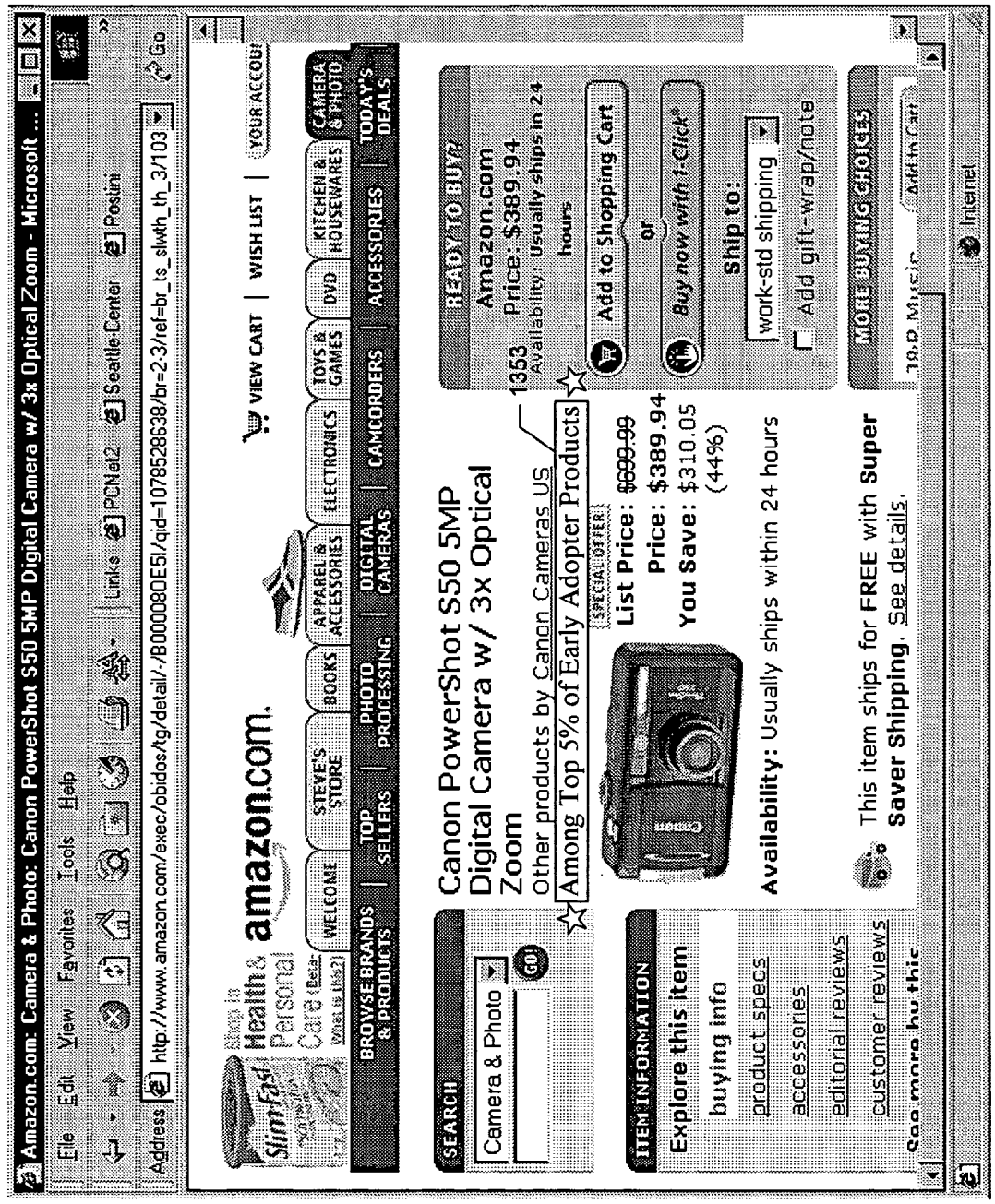

FIGS. 13A-13C are representative screenshots that depict the display of indications that a particular product has qualified as an early adopter product as the result of having been ordered by a number of identified early adopters. FIG. 13A shows an item detail page containing information about a digital camera product. Included in the information in the item detailed page is an indication 1351 that the digital camera product qualifies as an early adopter product. FIG. 13B shows an alternative indication 1352 of a particular early adopter score attributed to the product. FIG. 13C shows an alternative indication 1353 that reflects that the digital camera product is among the top five percent of early adopter products.

FIG. 12 shows sample contents of a customer score table 1500 typically used by the facility. The customer score table contains a row for each customer whose purchase of a product appears in the exhaustive product purchase table and who passed the tests of steps 702-704, such as row 1501 for customer 17193262. Each row is divided into a customer ID column 1511, a customer score column 1512 containing the scaled customer score for this customer, and a high value column 1513 containing the high value flag for this customer. The contents of this table may be used to identify early adopters and/or high value customers, for purposes including promoting these customers. Customers may be so identified by filtering the rows of the table to those whose customer score exceeds the threshold, and/or those whose high value flag is set.

Figure 14:

FIG. 14 is a screenshot diagram that depicts a sample welcome screen displayed to a customer who has been previously identified as an early adopter. The welcome screen 1450 includes a message identifying the user as an early adopter and conveying a special offer permitting the user to purchase a new product before it becomes generally available. The welcome page includes a link 1451 that the user may follow to take advantage of the special offer and purchase the new product.

It will be appreciated by those skilled in the art that the above-described facility may be straightforwardly adopted or extended in various ways. For example, the facility may use a variety of approaches to determining and scaling both customer scores and product scores; filtering tests for high value customers, early adopters, and/or early adopter picks; constant values; time windows; etc. While the foregoing description makes reference to preferred embodiments, the scope of the invention is defined solely by the claims that follow and the elements recited therein.

We claim:

1. A method in a computing system for assisting users in selecting items to order, comprising:

determining, for each of a plurality of items, via execution of instructions by a computing device, a score reflecting the extent to which the respective item has been ordered by customers who have been determined to commonly order items promptly after they become available, each score corresponding to a respective item; and incorporating information pertaining to said scores into item detail pages of an electronic catalog that provides functionality for customers to browse and place orders for items, said information enabling customers to compare at least some of the items in terms of an extent to which such items have been ordered by customers who commonly order items promptly after they become available;

wherein the method comprises using said scores to select a subset of items that represent early adopter selections, and incorporating information into corresponding item detail pages identifying each item in said subset as an early adopter selection.

2. The method of claim 1 wherein the method comprises including an indication of the score for an item in an item detail page for the respective item, said item detail page providing functionality for users to order the respective item.

3. The method of claim 2 wherein the included indication explicitly indicates the item's score.

4. The method of claim 2 wherein the included indication explicitly indicates a range into which the item's score falls.

5. The method of claim 2 wherein the included indication indicates a relationship between the item's score and scores for additional items.

6. The method of claim 1, wherein the method comprises generating each score such that it negatively relates to the amount of time that has elapsed since the respective item became available for ordering.

7. The method of claim 1, wherein the method comprises generating each score such that it positively relates to a price of the respective item.

8. The method of claim 1, wherein the method, including determining the scores, using the scores to select a subset of items, and incorporating information into item detail pages, is performed by a machine that comprises one or more computing devices.

9. A computer-readable medium whose contents cause a computing system to perform a method that comprises:

for each of a plurality of items, determining a score for the item in a manner that causes it to (1) positively relate to the extent to which the item has been ordered by customers who have been determined to commonly order items promptly after they become available, (2) positively relate to the item's price, and (3) negatively relate to the amount of time that has elapsed since the item became available for ordering;

storing, in physical computer storage, indications identifying at least a portion of the items having the highest scores; and responsive to a user accessing an item detail page for a first item of said items having the highest scores during browsing of an electronic catalog of items, outputting information to the user, via the item detail page, that reveals at least a range in which the first item's score falls, said item detail page being specific to said first item and providing functionality for placing an order for the first item.

10. The computer-readable medium of claim 9 wherein the contents of the computer-readable medium further cause the computer system to include, in item detail pages corresponding to said items having the highest scores, indications of the corresponding scores.

11. The computer-readable medium of claim 9 wherein the information comprises an indication of a percentile range associated with the score for the first item.

12. A system, comprising:

a computer data repository that stores purchase history data of each of a plurality of users, said purchase history data identifying purchases made by users of items represented in an electronic catalog of items, and specifying dates of said purchases, said electronic catalog including item detail pages corresponding to respective items;

a computer data repository that stores data regarding dates that particular items represented in the electronic catalog became available;

a data analyzer operative to use the purchase history data, in combination with the data regarding dates that particular items became available, to generate, for each of a plurality of said items, a score reflecting an extent to which the respective item has been purchased by users who are early adopters of new items, said data analyzer comprising executable code stored on a computer-readable medium; and a subsystem operative to cause information pertaining to said scores to be included on at least some of the item detail pages of the electronic catalog to assist users in making item selection decisions, said information enabling users to compare items in terms of an extent to which the items have been purchased by early adopters of new items.

13. The system of claim 12, wherein the information pertaining to said scores comprises an indication of a percentile range in which an item falls relative to other items.

14. The system of claim 12, wherein the information pertaining to said scores comprises numerical representations of said scores.

15. The system of claim 12, wherein the information pertaining to said scores comprises, for selected items whose scores satisfy a threshold, indications that said items are early adopter items.

16. The system of claim 12, wherein the data analyzer is operative to take item price information into consideration in generating the scores.

17. The system of claim 12, wherein the data analyzer is operative to generate the scores such that the score for an item negatively relates to an amount of time that has elapsed since the item became available.

18. The system of claim 12, wherein the data analyzer is operative to generate the scores such that the score for an item positively relates to a price of the item.

19. The system of claim 12, wherein the data analyzer comprises computer hardware that executes said executable code.

* * * * *